Oct. 22, 1963  R. L. MOORE ETAL  3,107,862
AUTOMATIC FLASH GUN
Filed Dec. 23, 1960  4 Sheets-Sheet 1
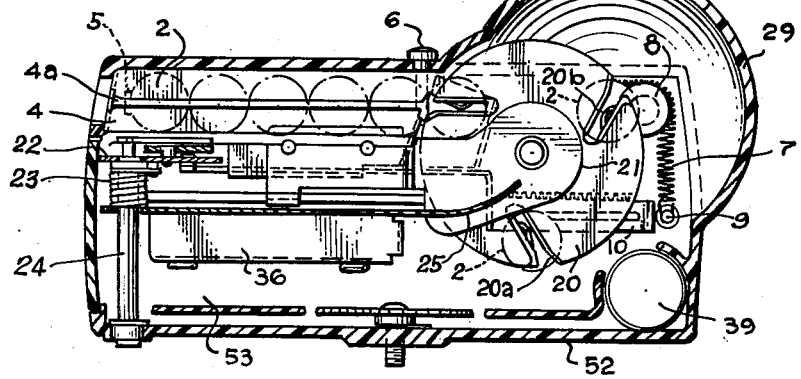
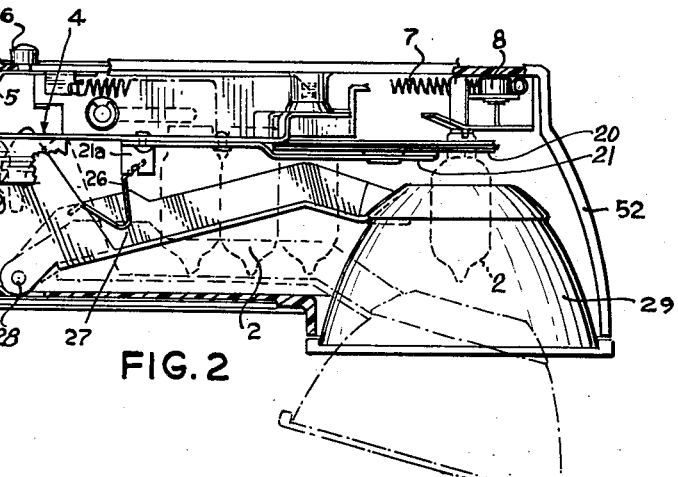
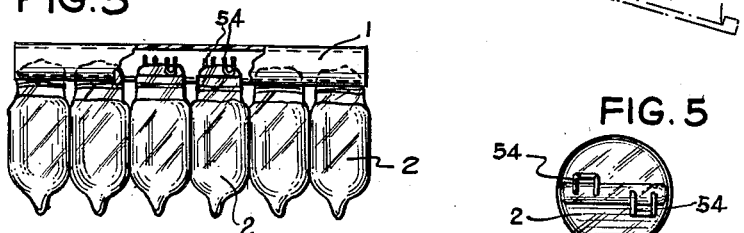
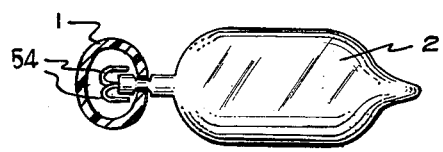
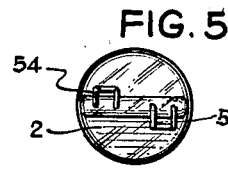
INVENTORS
ROBERT L. MOORE
RUDOLPH A. ROM
BY
ATTORNEYS Oct. 22, 1963

R. L. MOORE ETAL
AUTOMATIC FLASH GUN 3,107,862

Filed Dec. 23, 1960

INVENTORS
ROBERT L. MOORE
RUDOLPH A. ROM
BY Ooms, McDougall,
Williams & Sarah
ATTORNEYS Oct. 22, 1963  R. L. MOORE ETAL  3,107,862
AUTOMATIC FLASH GUN
Filed Dec. 23, 1960  4 Sheets-Sheet 3

INVENTORS
ROBERT L. MOORE
RUDOLPH A. ROM
BY
ATTORNEYS

Oct. 22, 1963   R. L. MOORE ETAL   3,107,862
AUTOMATIC FLASH GUN
Filed Dec. 23, 1960   4 Sheets-Sheet 4

INVENTORS
ROBERT L. MOORE
RUDOLPH A. ROM
BY
ATTORNEYS

United States Patent Office 3,107,862
Patented Oct. 22, 1963

3,107,862
AUTOMATIC FLASH GUN
Robert L. Moore, La Grange Highlands, and Rudolph A. Rom, Berwyn, Ill., assignors to Revere Camera Company, Chicago, Ill., a corporation of Delaware
Filed Dec. 23, 1960, Ser. No. 77,896
13 Claims. (Cl. 240—1.3)

This invention relates to a flash gun designed to accommodate a clip of conventional diminuitive flash bulbs of the type customarily designated AG–1, and, more particularly, to the mechanism for successively advancing the bulbs into firing position and depositing the used bulbs into a compartment provided for that purpose.

The AG–1 flash bulbs manufactured by General Electric, Sylvania, and Westinghouse, among others, are of relatively small size but nevertheless have a high lighting power. These bulbs are peculiarly adapted to automatic flash guns due to their small size, but no suitable gun has to this time been provided. Single shot guns require manual loading and unloading and are necessarily time-consuming. Present automatic flash guns have several principal disadvantages, including the inability to fire successive bulbs in rapid fashion, inability to handle an adequate number of bulbs, and the lack of suitable disposal facilities.

The primary object of this invention is to provide a flash gun which will eliminate the necessity for manually removing a used flash bulb and replacing it with an unused bulb in the interval between the taking of each photograph in any given picture-taking sequence, and which will automatically advance a series of flash bulbs from a loading or holding position into a firing position and discharge the used bulbs into a spent lamp compartment.

It is an additional object of this invention to provide an automatic flash gun which will be rapid firing and which is adapted to fire several shots without reloading.

A further object of this invention is the provision of an automatic flash gun which has means for self-disposing the spent bulbs and which is of a highly dependable construction.

These and other objects of this invention will hereinafter appear and for purposes of illustration, but not of limitation, specific embodiments of this invention are shown in the accompanying drawings, in which—

FIGURE 1 is a sectional view of the automatic flash gun embodying this invention;

FIGURE 2 is a top plane view, partly in section, of the automatic flash gun;

FIGURES 3–5 illustrate the AG–1 type bulbs adaptable for use with this flash gun and the loading clips provided therewith;

Figure 6:
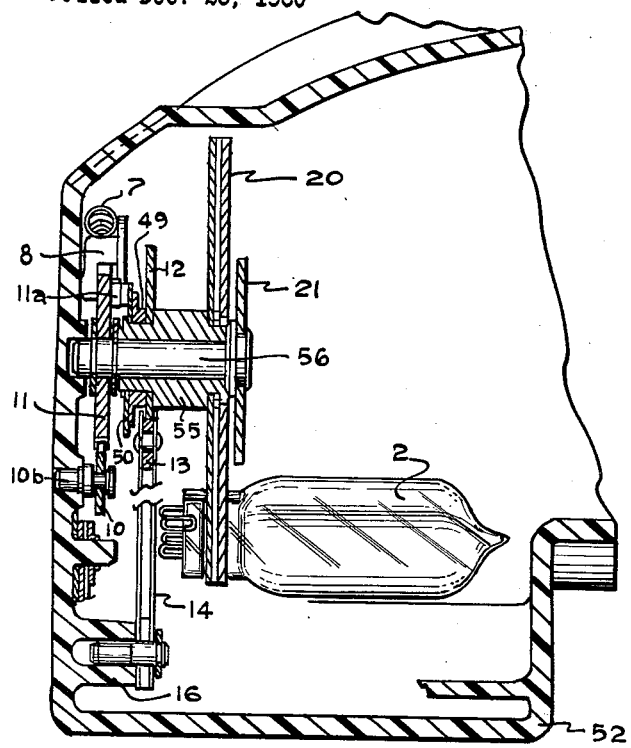
FIGURE 6 is a detail view, partly in section, showing the loading mechanism of this invention.
Figure 7:
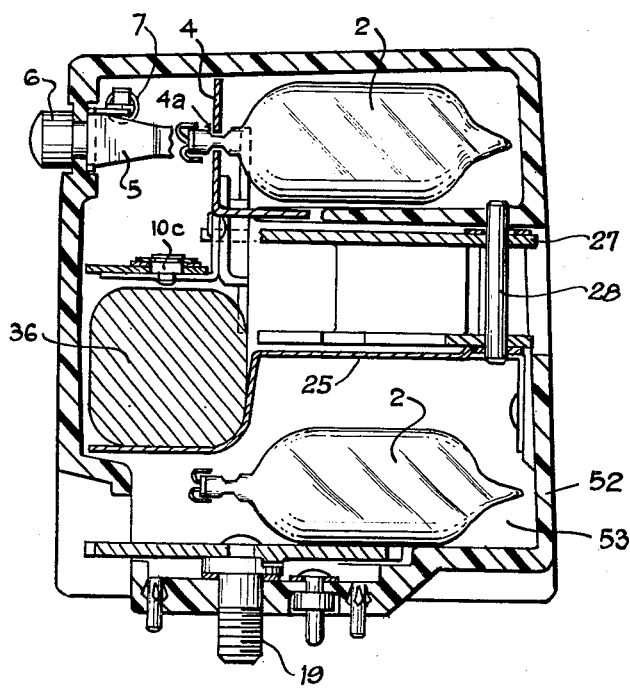
FIGURE 7 is a detail view, partly in section, showing the reserve and spent bulb compartments of the automatic flash gun.
Figure 8:
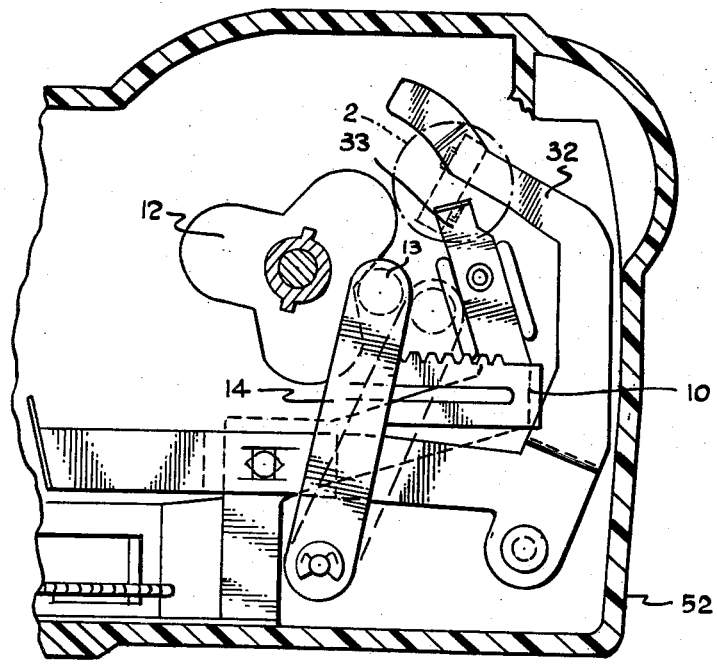
FIGURE 8 is a detail view, partly in section, illustrating additional portions of the loading mechanism and the electrical contacts for firing flash bulbs.

The automatic flash gun of this invention broadly consists of an apparatus which permits the insertion of a clip holding a plurality of flash bulbs into a compartment of the gun. The bulbs are loaded onto movable retaining means, successively introduced to a firing position, fired, and again moved whereby they are ejected into a spent bulb compartment. The sequence of a given bulb is immediately followed by a similar sequence of a succeeding bulb, the operation being accomplished in an exceedingly quick and dependable fashion.

In the accompanying drawings, FIGURE 1 shows a flash gun 51 embodying a housing 52 and a reflector 29 carried on a reflector holder bracket 27 (see FIG. 2).

In FIGURES 3–5, there is shown a clip 1 which holds the flash bulbs 2, the flash bulbs having bulb contacts 54.

Figures 9, 10:
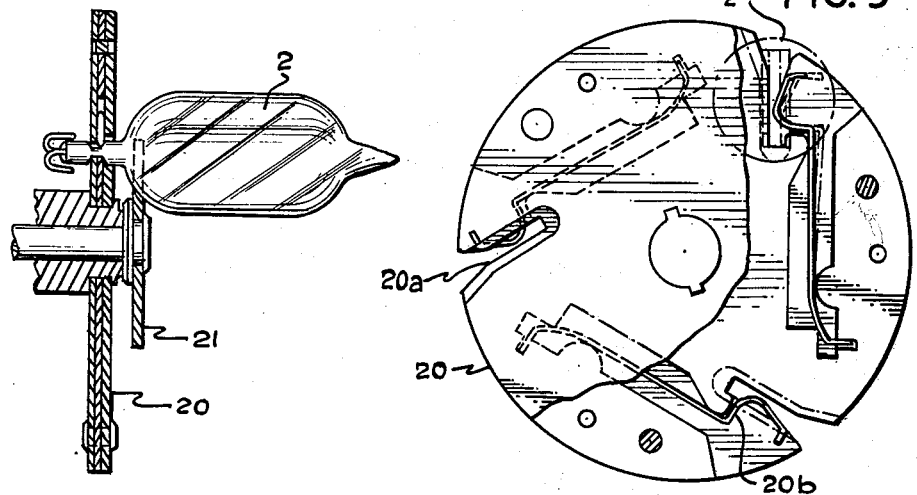
FIGURE 9 is a detail view, partly in section, of the loading disc and bulb-retaining means thereon.
FIGURE 10 is a sectional view taken across a diameter of FIGURE 9, illustrating an AG–1 bulb in the loaded position.
Figure 11:
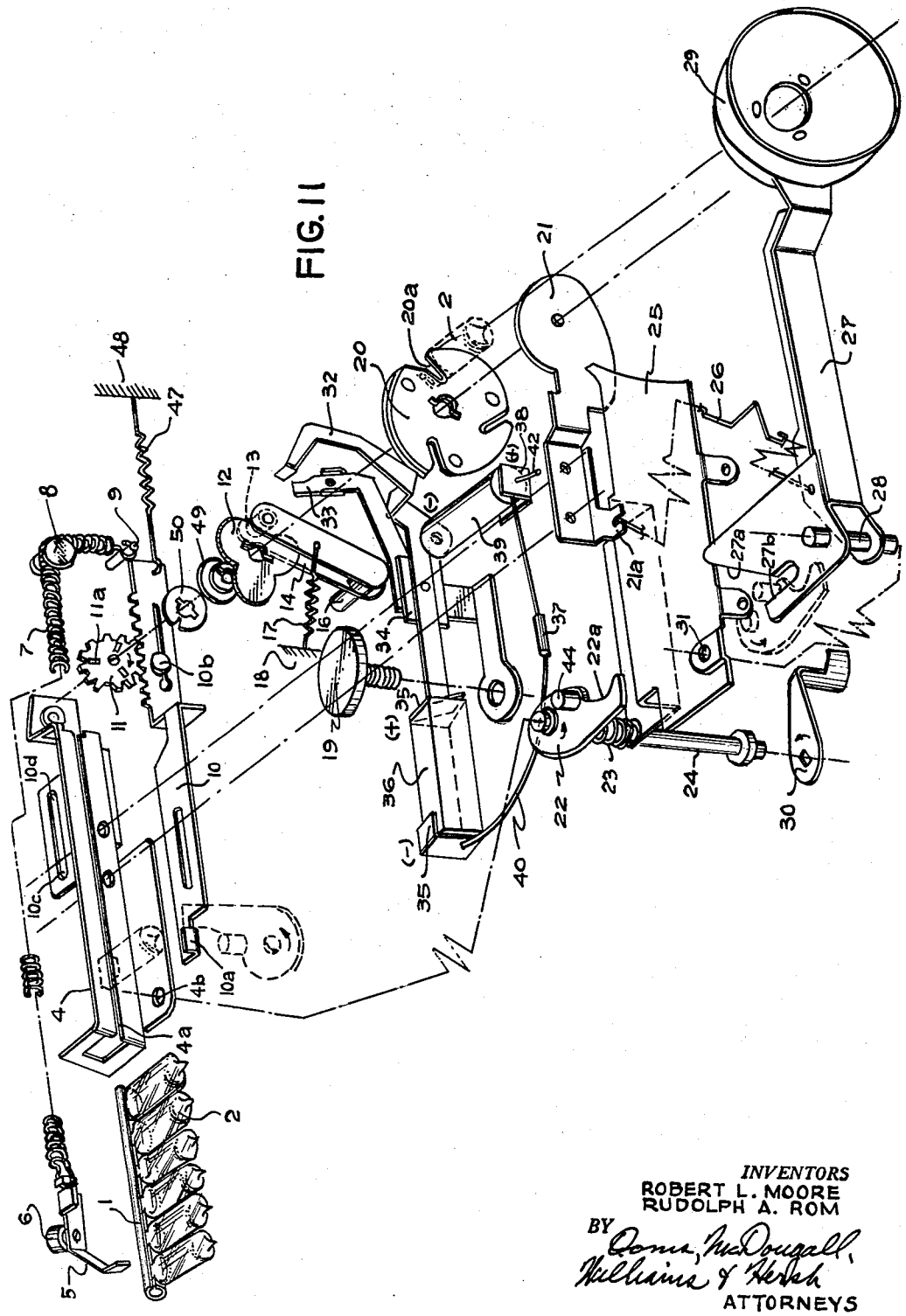
FIGURE 11 is an exploded view of the automatic flash gun of this invention.

Referring to FIGURE 11, there is shown a bulb holder bracket 4 with a slot 4a formed therein. Securing means are inserted in hole 4b, also located on the bulb holder bracket 4. A sliding bracket 5 with positioning means 6 is associated with the holder bracket 4, and a spring 7 is secured to the end of the sliding bracket 5, passes around the roller 8, with the other end secured to the stationary post 9. Located adjacent the bulb holder bracket 4 there is shown a rack 10 with an upright portion 10a and a securing stud 10b. The stud 10b is associated with pins which will be inserted in the slot 10c on the bulb holder bracket 4. A gear 11 is associated with the teeth on the rack 10. The gear has protrusions 11a formed on the face thereof. Positioned on the same axis as the gear 11 is a star wheel 12 which is operatively associated with a roller 13 positioned on arms 14, which arms are pivoted about the rod 16. A retaining spring 17 is stationarily secured at one end to post 18 and movably secured to the arms 14. Also secured on the same axis as the gear 11 is a disc-type bulb holder 20 having recesses 20a formed therein, and retaining springs 20b associated with the recesses 20a (see FIGURE 9).

A bracket 21, also located on the aforementioned axis, has an offset portion 21a to which is secured a double-acting spring 26. The opposite end of the spring 26 is secured to the reflector holder bracket 27. Cam means 22, with cam surface 22a, is positioned on shaft 24, there being a coil spring 23 urging the cam 22 to its normal position. The stamping 25 is employed to position the bracket 21 and cam means 22 in their operative arrangements. As can be seen in FIGURE 11, the reflector bracket holder 27 is provided with cam surface 27a and slot 27b, and is pivoted about shaft 28.

The operating lever 30 is secured to the shaft 24 and adapted to move the cam 22 in opposition to the urging of coil spring 23.

Contact arms 32 and 33 are positioned to fire bulbs retained on the bulb holder 20. These arms are secured to post 34, and arm 32 terminates in a plate 35 electrically connected to a battery 36. A similar plate 35 connected to the battery is electrically associated through wires 40 and 41 and resistor 37 to plate 38, which is associated with condenser 39. Wire 42 connects plate 38 and a terminal post (not shown).

The operation of the automatic flash gun of this invention may be explained as follows. A representative clip 1 of six flash bulbs 2 will be removed in a sliding manner and passed into the slot 4a of the bulb holder bracket 4. The sliding bracket 5 is positioned by the means 6 against the action of the spring 7 whereby the end of the bracket 5 will engage the furthermost bulb 2. When the bulbs are loaded, the foremost bulb 2 is forced by the action of the spring 7 on the bracket 5 into a recess 20a on the bulb holder 20.

The operation of the sliding bracket 5 will be more clearly understood when referring to FIGURES 1 and 2 of the drawings. As illustrated, the end of the bracket 5 is located adjacent the underside of the holder bracket 4 and it will also be noted that the ends of the bulbs extend beneath the holder 4. Accordingly, the end of the bracket 5 is adapted to engage the protruding ends of the bulbs and to urge the row of bulbs toward the recesses in the bulb holder 20.

Upon turning the operating lever 30 against the action of the coil spring 23, reflector 29 is actuated by cam 22, transmitting force to the stud 44 located on the cam 22. The stud 44 acts upon the cam surface 27a of holder 27, whereby the reflector assembly is pivoted about shaft 28, the shaft 28 being inserted in the hole 31. The reflector is thus swung forward and held in this position by the over-center travel action of double-acting spring 26, this movement clearing a space to permit the insertion of a bulb located on the bulb holder 20 into firing position.

The insertion of a bulb into firing position is effected by the continued actuation of the cam 22 since the cam surface 22a thereof will act upon upright 10a on the rack 10. This moves the rack 10 to the left while guided between the stud 10b and pins located in the slot 10c.

The movement of the rack 10 imparts a rotary action to the gear 11 which is free to rotate on a shaft secured to the bulb holder 20. A sleeve-type bushing 55 (see FIGURE 6) rotates about said shaft and has secured to it in a locked fashion a flat spring 50, spacer 49, star wheel 12, and the bulb holder 20. The bushing and the attendant parts operate within the area defined by the bulb holder 20 and the gear 11. One face of the gear 11 has three protrusions 11a spaced at 120° intervals formed thereon which, when functioning in conjunction with the flat spring 50 which is secured to the spacer 49 and the star wheel 12, becomes a clutch assembly. As one protrusion engages the flat spring 50 to rotate bulb holder 20 and the star wheel 12 in a clockwise direction, the bulb in the recess 20a adjacent the end of the bracket 5 is rotated until about 105 degrees' traverse is effected. At this point, the action of the roller 13 on the detented portions of the star wheel 12 causes the final 15 degrees of travel to be effected. The bulb being now in the firing position, a return action of the operating lever 30 due to the effect of coil spring 23 will cause the rack 10 to return to its spring-loaded stop position, and the slip action of clutch flat spring 50 will permit the loaded bulb to remain in the firing position. The stud 44 of cam 22 acts upon the surface formed by the slot 27b in such a manner that the reflector 29 is returned to its normal position around the loaded bulb.

In considering the operation of the clutch assembly, reference is made in particular to the flat spring 50. This spring is of a well-known type which is notched as illustrated whereby one inner surface of the notch is adapted to engage the protrusions 11a on the gear 11 when the gear is rotating in a clockwise direction. When the gear is rotating in a counterclockwise direction, the protrusions will slide over the protruding notch surface and, therefore, the bushing to which the notched spring 50 is connected will not rotate with the gear when the gear is moving counterclockwise.

The star wheel 12, associated arms 14 and wheel 13 serve to prevent counterclockise rotation of the spring 50 and, more important, the bushing 55 upon which the spring, star wheel and bulb holder 20 are mounted. To review the operation, one protrusion 11a will engage a protruding notch in the spring 50 when the rack 10 is moved to the left. Accordingly, the common bushing 55 for the spring and bulb holder 20 will cause rotation of the bulb holder and the wheel 13 will then be caused to move into a succeeding detent on the star wheel 12. When the rack 10 is moved to the right and the gear 11 rotated in the counterclockwise direction, the protrusions 11a will slip over the spring 50 and, since the wheel 13 is holding the star wheel 12 in position, there will not be a corresponding counterclockwise rotation of the bulb holder 20.

This first bulb is now loaded in the disc-type bulb holder 20 in the firing position and the bulb contacts 54 will be engaged with the contact arms 32 and 33 on the bulb, such that actuation of the camera shutter release will cause firing of the loaded bulb in a well-known manner.

The electrical network shown is intended to be strictly conventional and may briefly be described as follows. A terminal lug (not shown) will transmit current through screw 19 which is secured to the metal housing of the camera being used with the flash gun, thus completing a ground through the camera. The battery employed is a conventional 22½ volt unit, while the condenser is a 250 mfd. 30–100%, 25 v. D.C. unit, and the resistor is a 2200 ohm resistor.

After firing of the loaded bulb is accomplished, the rotation of operating lever 30 will cause the next bulb to be positioned in the firing position in the manner heretofore described. It will be obvious, of course, that in the specific structure shown the succeeding bulb will be positioned in a recess 20a, 120 degrees offset from the recess of its predecessor, as soon as the first bulb has reached the firing position. The operation of the ejecting means for the spent bulbs is best understood when considering FIGURE 1 in combination with FIGURE 11. As shown in FIGURE 1, the contoured member 21 provides an abutment means in the path of movement of a spent bulb whereby the bulb will be removed from the bulb holder. The perpendicularly positioned stamping 25 also provides an abutment means whereby bulbs located on the discs 20 will be dropped into the spent bulb chamber as the disc rotates. Thus, ejection of the spent bulb is effected during the same rotating cycle which loads a succeeding bulb. The first bulb will be free to move when the reflector 29 has been pivoted away in the previously described manner, and its rotation on the disc holder 20 will cause it to abut against the contoured cam surface of the bracket 21. This contoured cam surface, shown as the lowermost portion of the bracket 21, is operatively associated with the stamping 25 and the movement of the bulb into engagement with the contoured cam surface at its juncture with the stamping 25 will cause the bulb to slide from the recess 20a and fall into the spent bulb compartment 53.

In the automatic flash gun construction shown in the drawings, three recesses 20a are formed in the bulb holder 20. In the previously described sequence, the first bub will be retained in a recess 20a after firing, and after it is moved away from the firing position it will not be ejected until the second bulb is fired and moved from the firing position. In other words, the position of the recess 20a holding the first bulb will not reach the juncture of the bracket 21 and the stamping 25 until the second bulb is rotated away from the firing position. This holding period for a fired bulb permits the hot bulb to cool off and avoids sticking and jamming of the flash gun mechanisms.

The apparatus of this invention has among its obvious advantages the additional feature of being adaptable for sequential movement with the film-winding apparatus of the camera associated therewith. Since the operating lever 30 must be rotated to load a bulb, it would be a matter of simple mechanics to adapt this rotary movement to the film-winding apparatus of most cameras.

The particularly unique features of this invention enable the firing of bulbs and automatic operation of the flash gun in any conceivable position. This is due to the fact that the operation of all the movable parts is dependent on mechanical urging from an operatively connected member and not at all dependent on gravitational forces.

The swing-out reflector employed in the specific example heretofore disclosed plays an important part in the dependable operation of the automatic flash gun. If a stationary reflector were employed with slots or openings which would permit insertion of new bulbs and passage of spent bulbs into the ejection compartment, there would be a danger of firing of the unspent bulbs. Since the swing-out reflector has substantially continuous surfaces, it will guard against heat being transmitted from a fired bulb to the unfired bulbs.

The particular design of the automatic flash gun was employed only by way of a specific example and it will be understood that modifications, particularly in the number of bulbs to be loaded and in equivalent mechanical devices which will perform substantially the same function, may be made without departing from the spirit of this invention, particularly as defined in the following claims.

We claim:

1. An automatic flash gun adapted to fire a series of flash bulbs without reloading, including a housing, a reflector unit for said housing, means movably connecting said unit to said housing whereby said unit can be moved to a firing position and to a loading position, said gun further comprising means within said housing to hold a plurality of flash bulbs, movable means having a plurality of bulb-retaining means thereon, means to move one of said retaining means to a position adjacent said plurality of bulbs, means to place a bulb within said retaining means, means to move said bulb to its firing position, means to move said reflector unit away from its firing position prior to the movement of the bulb to the firing position, and means for returning said reflector unit to said firing position after the bulb is moved to its firing position.

2. The automatic flash gun according to claim 1 including means for moving a spent bulb away from said firing position after firing thereof, said last mentioned means comprising the same means as those employed for moving said retaining means adjacent said plurality of bulbs, and wherein a different one of said retaining means is moved adjacent said plurality of bulbs during each operating cycle.

3. An automatic flash gun adapted to fire a series of flash bulbs without reloading and having a firing and a loading position, comprising means to hold a group of unfired bulbs, movable means having a plurality of bulb retaining means located thereon, said movable means comprising a disc and said retaining means comprising recesses dimensioned to receive the ends of said bulbs and holding springs secured to said movable means and located to normally extend into each of said recesses whereby said bulb ends are resiliently retained when moved into said recesses against said holding springs, means for moving one of said retaining means to a position adjacent said group of bulbs, means for forcing one of said bulbs into said retaining means, means for moving said one bulb to the firing position, means for firing said bulb, means for moving said spent bulb away from said firing position, and means for ejecting said spent bulb from said retaining means.

4. An automatic flash gun adapted to fire a series of flash bulbs without reloading, including a housing, reflector unit for said housing, means pivotally connecting said unit to said housing whereby said unit can be moved to a firing position and to a loading position, said gun further comprising means within said housing to hold a plurality of flash bulbs, movable means having a plurality of bulb-retaining means thereon, means to move one of said retaining means to a position adjacent said plurality of bulbs, means to place a bulb within said retaining means, means to move said bulb to its firing position, means to pivot said reflector unit away from its firing position prior to the movement of the bulb to the firing position, and means for returning said reflector unit to said firing position after the bulb is moved to its firing position.

5. The automatic flash gun according to claim 4, including means for moving a spent bulb away from said firing position after firing thereof, said last mentioned means comprising the same means as those employed for moving said retaining means to said group of bulbs, and wherein a different one of said retaining means is moved adjacent said group of bulbs during each operating cycle.

6. The automatic flash gun according to claim 4 wherein said means for returning said reflector unit includes a clutch assembly.

7. The automatic flash gun according to claim 4 including abutment means located within said housing at a point beyond said firing position and in the path of movement of the bulbs retained in said movable means, said abutment means adapted to force said bulbs out of said retaining means when the spent bulbs move into contact therewith.

8. The automatic flash gun according to claim 7 wherein said housing contains a spent bulb compartment into which spent bulbs are ejected.

9. An automatic flash gun adapted to fire a series of flash bulbs without reloading and having a firing and a loading position comprising a housing, a bracket within said housing, a slot formed within said bracket for receiving a row of unfired bulbs, the ends of said bulbs protruding through said slot beneath said bracket, a rotary disc, recess portions in said disc adapted to receive said bulbs, a sliding bracket having an extending portion engaging the protruding end of the bulb positioned at the end of said row away from said recess portions, spring means connected to said sliding bracket normally urging the row of bulbs toward said disc, a gear connected to said disc, a rack with an upright portion thereon operatively connected with and adapted to rotate said gear, a cam means with a stud portion formed thereon, a reflector holder pivotally secured to said housing and having a cam surface thereon, and means to operate said cam means whereby upon operation of said cam means said stud portion engages said reflector holder cam surface and moves said holder from firing position to loading position, said cam means also engaging the upright portion of said rack, whereby said rack is moved causing said gear to rotate said disc until one of said recess portions holding a loaded bulb carries said bulb to firing position.

10. The automatic flash gun according to claim 9 wherein the carrying of said bulb to firing position results in a second recess portion being located adjacent said slot and a second bulb being forced into said second recess portion by said sliding bracket.

11. The automatic flash gun according to claim 9 including a clutch assembly interposed between said gear and said disc and adapted to permit reverse return movement of said gear, rack, and associated cam means to firing position without movement of said disc.

12. The automatic flash gun according to claim 10 including abutment means located within said housing at a point beyond said firing position and in the path of movement of bulbs retained in said movable means, said abutment means being adapted to force said bulbs out of said retaining means when the spent bulbs move into contact therewith, and said abutment means being located whereby the spent bulbs are ejected immediately prior to loading of said second bulb into said second recess.

13. The automatic flash gun according to claim 12 including a third recess portion located in said disc permitting a dwell period subsequent to firing and before ejection of a spent bulb.

References Cited in the file of this patent

UNITED STATES PATENTS

| | | |
|---|---|---|
| 2,170,552 | De Porter | Aug. 22, 1939 |
| 2,408,469 | Malloy | Oct. 1, 1946 |
| 2,672,039 | Schwartz | Mar. 16, 1954 |
| 2,866,085 | Burroughs | Dec. 23, 1958 |